(12) United States Patent  
Inoue et al.

(10) Patent No.: US 8,055,255 B2  
(45) Date of Patent: Nov. 8, 2011

(54) WIRELESS COMMUNICATIONS SYSTEM

(75) Inventors: Masugi Inoue, Tokyo (JP); Mikio Hasegawa, Tokyo (JP); Khaled Mahmud, Tokyo (JP); Homare Murakami, Tokyo (JP)

(73) Assignee: National Institute of Information and Communications Technology, Incorporated Admistrative Agency, Tokyo (JP)

( * ) Notice: Subject to any disclaimer, the term of this patent is extended or adjusted under 35 U.S.C. 154(b) by 242 days.

(21) Appl. No.: 10/579,732

(22) PCT Filed: Nov. 19, 2003

(86) PCT No.: PCT/JP03/14727  
§ 371 (c)(1),  
(2), (4) Date: Dec. 5, 2006

(87) PCT Pub. No.: WO2005/051031  
PCT Pub. Date: Jun. 2, 2005

(65) Prior Publication Data  
US 2008/0019294 A1 Jan. 24, 2008

(51) Int. Cl.  
*H04Q 7/20* (2006.01)
(52) U.S. Cl. .................. 455/426.1; 370/310
(58) Field of Classification Search .......... 455/426.1, 455/127.4  
See application file for complete search history.

(56) References Cited

U.S. PATENT DOCUMENTS

| 6,393,014 | B1 * | 5/2002 | Daly et al. ................ 370/352 |
| 6,954,442 | B2 * | 10/2005 | Tsirtsis et al. ............. 370/328 |
| 7,113,799 | B2 * | 9/2006 | Ahmad et al. ............. 455/458 |
| 2001/0029191 | A1 | 10/2001 | Wilhelm |
| 2002/0095486 | A1 * | 7/2002 | Bahl ........................... 709/223 |
| 2003/0016639 | A1 * | 1/2003 | Kransmo et al. ........... 370/335 |
| 2003/0043773 | A1 | 3/2003 | Chang |
| 2003/0054818 | A1 * | 3/2003 | Bahl et al. ................. 455/432 |
| 2003/0157936 | A1 * | 8/2003 | Ohtani et al. .............. 455/436 |
| 2004/0137901 | A1 * | 7/2004 | Hamasaki et al. ......... 455/436 |
| 2004/0242240 | A1 * | 12/2004 | Lin ............................ 455/456.3 |
| 2004/0259541 | A1 * | 12/2004 | Hicks et al. ............... 455/426.1 |

FOREIGN PATENT DOCUMENTS

| EP | 1 289 223 A2 | 3/2003 |
| JP | 2002-223467 A | 8/2002 |
| JP | 2003-309879 A | 10/2003 |
| WO | WO-01/35585 A1 | 5/2001 |
| WO | WO-01/47316 A2 | 6/2001 |
| WO | WO-01/58190 A1 | 8/2001 |
| WO | WO-03/003639 A2 | 1/2003 |

OTHER PUBLICATIONS

"Universal Mobile Telecommunication System (UMTS); Non-Access-Stratum functions related to Mobile Station (MS) in idle mode (3GPP TS 23.122 version 4.1.0 Release 4", ETSI 3rd Generation Partnership Project, ETSI TS 123 122 V4.1.0, XX, XX, Jun. 1, 2001, pp. 1-34.

* cited by examiner

*Primary Examiner* — Dwayne Bost  
*Assistant Examiner* — Joseph Dean, Jr.  
(74) *Attorney, Agent, or Firm* — Birch, Stewart, Kolasch & Birch, LLP

(57) ABSTRACT

The present invention is a wireless communications system for simultaneously establishing a basic access network and a wireless access network using at least two kinds of wireless communication networks. The basic access network executes signaling communication in which communication is controlled so as to be continuously switched, whereas the wireless access network executes data communications other than the signaling communication. According to the system of the present invention, networks can be continuously switched by setting multicast for temporarily flowing data to the basic access network.

9 Claims, 16 Drawing Sheets

WIRELESS COMMUNICATIONS SYSTEM

TECHNICAL FIELD

The present invention relates to a technology for continuously switching different wireless communication networks when data communication is executed using at least two types of wireless communication networks. In particular, the present invention relates to a method of establishing and realizing a control network relating to communication switching control and other networks simultaneously.

BACKGROUND ART

Various types of wireless communication networks, which have been in practical use nowadays such as customer-owned systems, for example, wireless LAN, Bluetooth, and the like and public network systems, for example, mobile phone, PHS, and the like function independently of each other at present, and users selectingly use them according to applications, areas, communication speeds, and the like.

Since these wireless communication networks have various communications speeds, service areas, communication costs, and the like depending on the types thereof, it is necessary to appropriately switch the networks depending on a location where they are connected in place of using a particular network at all times.

At the time, it is required a seamless handover technology that integratingly handles the respective systems, selects an appropriate network and switches a network being used to it without causing a user to be aware of the switching, and executes communication continuously without interrupting it.

As the method described above, it is contemplated to separate a network, through which communication is executed to control switching of network and the like, from a network through which data communication is executed. It is known a method of establishing data communication and audio communication also in a wireless communications system that does not have a paging function originally by using a wide area wireless communications system as disclosed in, for example, PCT application (PCT/JP02/13187) proposed by the applicants. According to the technology, it is proposed to use a wide area wireless communications system having a paging function of, for example, a pager line and the like as an exclusive system for paging as well as to use, for example, wireless LAN and the like as the wireless communications system and to utilize them by combining the characteristics of them, respectively.

The method intends to effectively utilize existing infrastructures, in particular, the pager line and the like. However, since a whole system is constructed by previously determining a particular network as a control network, a problem arises in that the system does not function in locations, for example, an oversea area, an isolated island, and the like where the control network cannot be used.

Further, even when a plurality of networks can be used for data communications, the data communications cannot be executed while continuously switching the networks. In particular, when communication is switched between wireless communication networks to which base stations are connected at positions different in network, a technology for not only switching a terminal wireless system promptly but also properly switching a data transmission path on a network side is necessary, and it is desired to realize the technology.

DISCLOSURE OF THE INVENTION

The present invention, which was created in view of the above background, realizes continuous switching of communications using a wireless communication network used for control and data communication networks other than the network for control. Further, the control network is arranged such that an optimum network can be selected to thereby realize a highly flexible network connection environment.

The present invention is a wireless communications system which uses at least two kinds of wireless communication network and enables to simultaneously connect to a basic access network for executing signaling communication in which communication is controlled so as to be continuously switched and to a wireless access network for executing data communications other than the signaling communication, and the wireless communications system includes a wireless communication terminal and a wireless communication server.

In an embodiment of the present invention, each of the wireless communication terminals includes a seamless application processing unit for executing connection processing to the basic access network and connection/disconnection processing to and from the wireless access network, a basic access network client processing unit having a client function in the signaling communication, a multicast communication node application processing unit for setting multicast reception using at least the two kinds of the wireless communication networks, and respective network devices corresponding to the respective wireless communication networks.

In an embodiment of the present invention, the wireless communication server includes a home agent application processing unit for setting a multicast transmission using at least the two kinds of the wireless communication networks, a basic access network server processing unit for notifying, when the wireless communication networks are continuously switched, the wireless communication terminals of a wireless communication network acting as a switching candidate, for managing the signaling communication for communicating the status of the respective wireless communication terminals therebetween, and for managing the registration/update processing of the respective wireless communication terminals, a terminal status table for managing the status of the respective wireless communication terminals, a terminal configuration table for managing wireless communication network interfaces implemented in the respective wireless communication terminals, and a preference setting table for managing the order of the wireless communication networks acting as switching candidates when the wireless communication networks are continuously switched.

In a wireless communications system according to an embodiment of the present invention, a wireless communication server is composed of two servers, that is, a home agent server having the home agent application processing unit and the basic access network server processing unit and a resource server including the terminal status table, the terminal configuration table, and the preference setting table. Then, the basic access network server processing unit provides the wireless communications system that obtains or registers the information in the respective tables of the resource server though a wired or wireless communication network.

In an embodiment of the present invention when the seamless application processing unit of the wireless communication terminal executes connection processing to the basic access network, the seamless application processing unit tries to connect to the network with reference to basic access network candidate information that in advance records the wireless communication networks used as a candidate for the basic access network as well as when the network cannot be connected, the seamless application processing unit executes processing for sequentially trying to connect to a next candidate network.

In an embodiment of the present invention when the network device of a wireless communication terminal detects abnormal communication of the wireless access network in the wireless communication network, the seamless application processing unit notifies the multicast communication node processing application unit of switching of communication to the basic access network and then switches the communication in the condition that the wireless access network is not the same as the basic access network and the basic access network is connected. Then, the seamless application processing unit tries to connect to a wireless access network acting as a next candidate with reference to wireless access network candidate information that in advance records the candidates of wireless communication networks used as the wireless access network as well as when the network cannot be connected, the seamless application processing unit executes processing for sequentially trying to do network connection to a next candidate.

In an embodiment of the present invention, when a user instructs to switch the wireless access network or the basic access network in the wireless communication terminal, after the seamless application processing unit notifies the multicast communication node application processing unit of switching of communication to the basic access network, the seamless application processing unit executes processing for changing network connection from the current wireless access network or basic access network to a specified wireless access network or basic access network.

In an embodiment of the present invention, the terminal status table provides information relating to at least the identification symbols of the wireless communication terminals, the basic access network in use, the wireless access network in use, and a multicast communication status.

Figure 1:
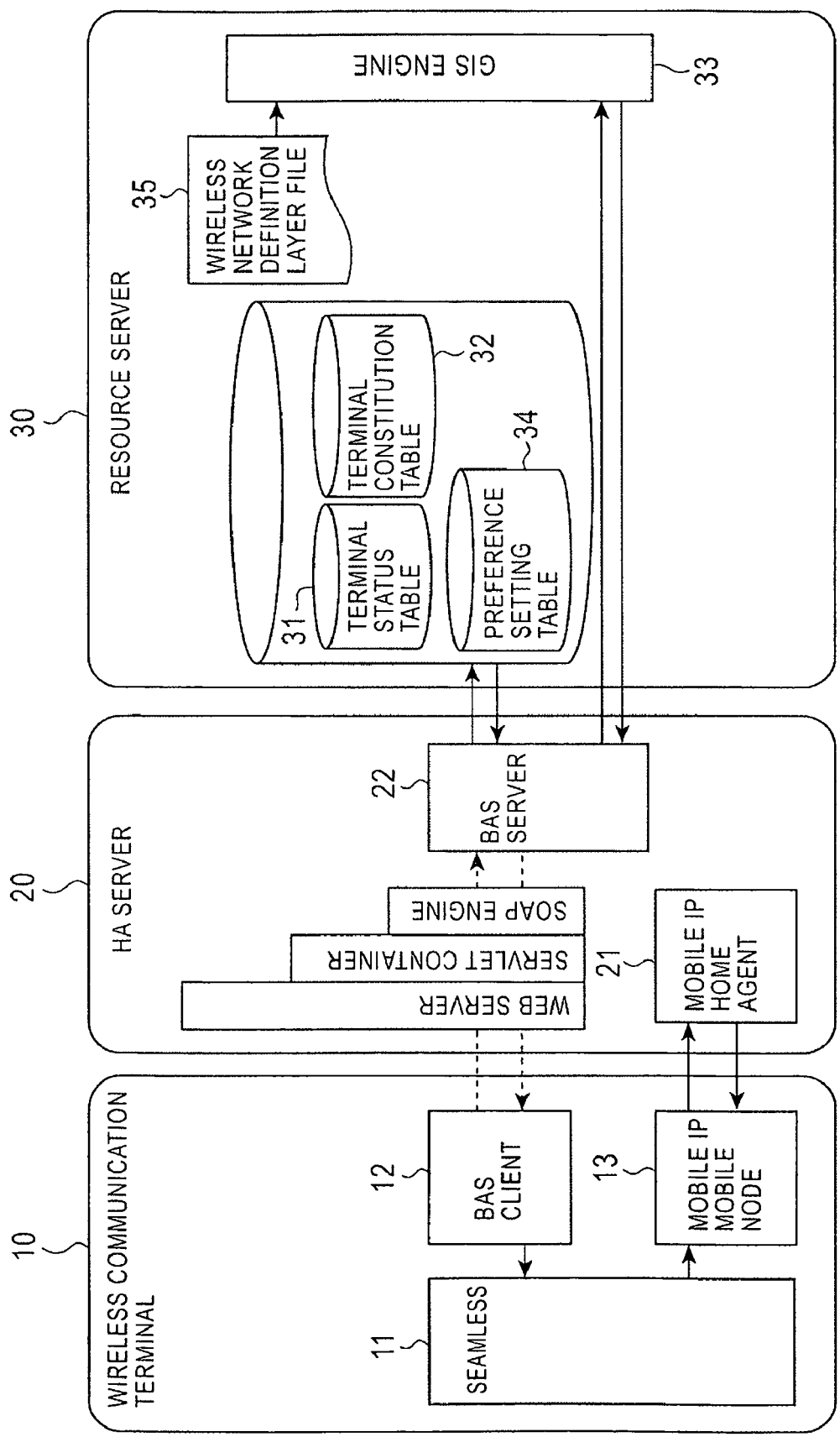
FIG. 1 is a whole configurational view of a wireless communications system according to the present invention.

Portions denoted by reference numerals are as shown below. 10: wireless communication terminal, 11: seamless application processing unit, 12: BAS client processing unit, 13: Mobile IP mobile node processing unit, 20: home agent server, 21: Mobile IP home agent processing unit, 22: BAS server, 30: resource server

BEST MODE FOR CARRYING OUT THE INVENTION

A method of embodying the present invention will be explained based on an embodiment shown in the figures. Note that the embodiment of the present invention is not limited to the one described below and may be appropriately modified.

FIG. 1 is a whole configurational view of a wireless communications system according to the present invention. The system is composed of a wireless communication terminal (10) that can be carried by a user, a home agent server (20) connected through a wireless communication network, and a resource server (30). The home agent server (20) is connected to the resource server (30) through a wired or wireless communication network. In addition to the above arrangement, a single wireless communication network may be arranged by integrating both the servers (20) and (30).

The wireless communication terminal (10) realizes mobility as a mobile node of Mobile IPv4 and continuously switches wireless communication networks by automatic control.

Figure 2:
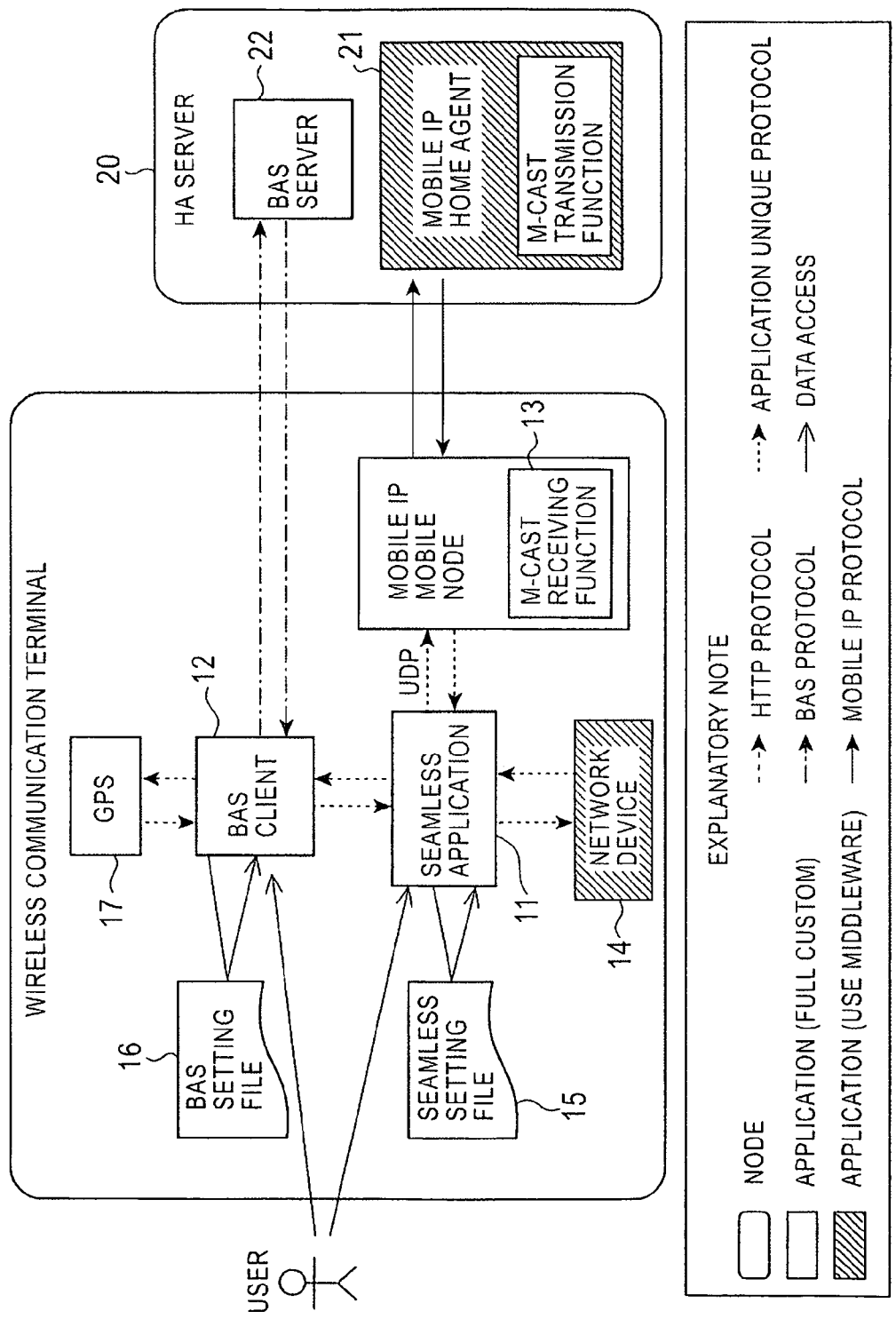
FIG. 2 is a configurational view explaining a wireless communication terminal in detail.

FIG. 2 is a configurational view explaining the wireless communication terminal (10) in detail. The terminal (10) is composed of a known personal computer and a PDA (Personal Digital Assistant) and includes a seamless application processing unit (11), a basic access network client processing unit (hereinafter, referred to as BAS client processing unit) (12), a Mobile IP mobile node application processing unit (13) as a multicast communication node application processing unit, and a network device (14) corresponding to the wireless communication network as shown in the figure. Further, the wireless communication terminal (10) stores a seamless setting file (15) used in the seamless application processing unit (11) and a BAS setting file (16) used in the BAS client processing unit (12) in a memory in the terminal (10) or in an external storage unit.

The Mobile IP mobile node application processing unit (13) of the present invention supports Simultaneous bindings of Mobile IP. After the Mobile IP mobile node processing unit (13) executes Registration by Simultaneous bindings, it receives the same packets sent from the home agent server (20) and disables one of them.

Figure 3:
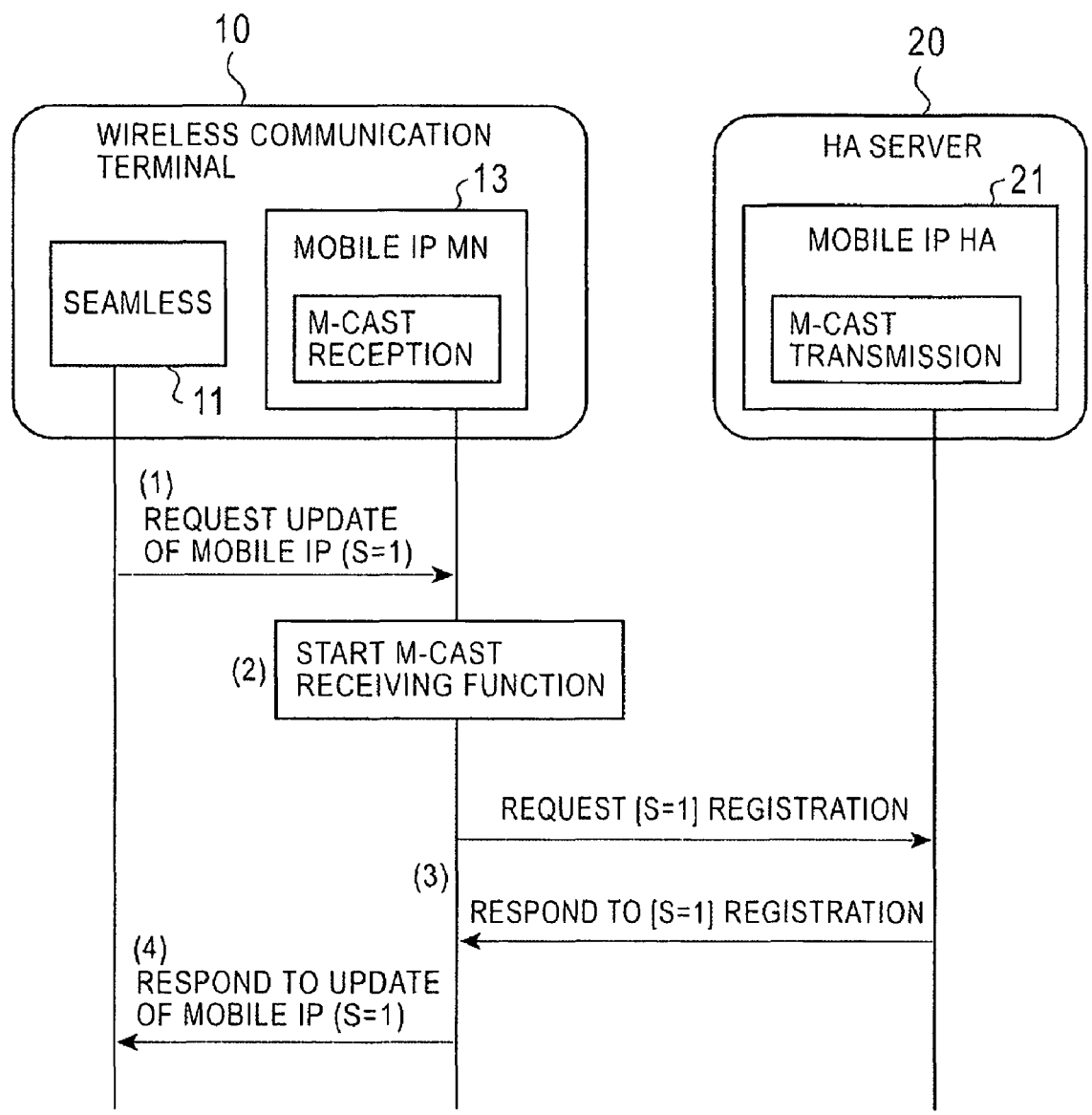
FIG. 3 shows a sequence for setting M-cast reception.

The Mobile IP mobile node processing unit (13) provides a function for setting and canceling multicast (M-cast) reception. FIG. 3 shows a sequence for setting M-cast reception. Reception is set in response to an instruction for setting M-cast reception from the seamless application processing unit (11) that will be described below, and Registration Update is requested to a Mobile IP home agent processing unit (21) as a home agent application processing unit of the home agent server (20). At the time, parameter S=1 is sent in Registration Update.

A response to Registration Update (S=1) is returned from the Mobile IP home agent processing unit (21), and a response of Mobile IP Update is further notified to the seamless application processing unit (11) from the Mobile IP mobile node application processing unit (13). Note that when no response is returned from the home agent server (20), registration update is requested again, and when no response is returned for a predetermined period of time, the processing is finished by the seamless application processing unit (11).

Figure 4:
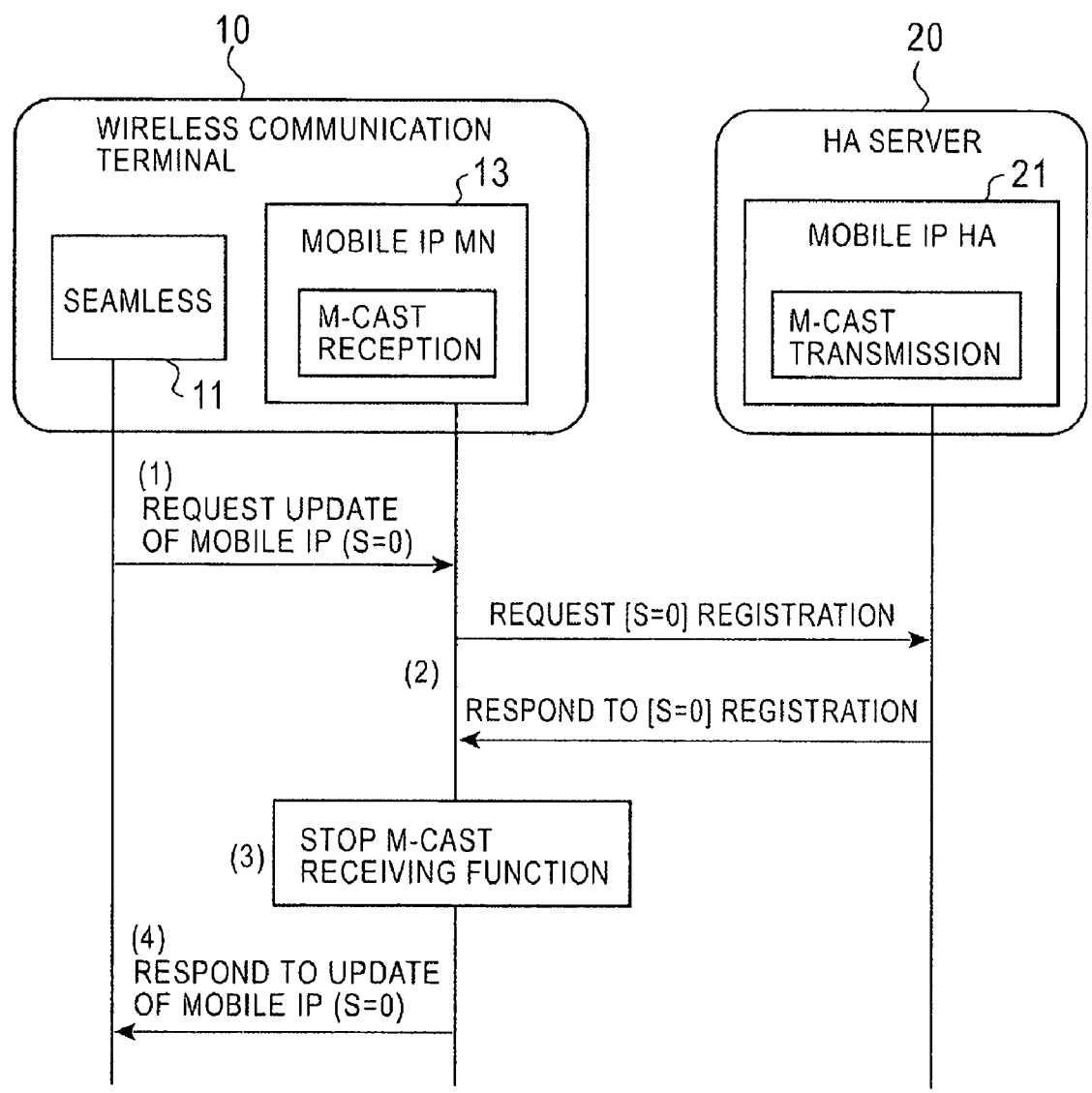
FIG. 4 shows a sequence for canceling the M-cast reception when multi cast is finished.

In contrast, when the multicast is finished, the M-cast reception is canceled. FIG. 4 shows a sequence at the time. Although the same sequence is also employed when the M-cast reception is canceled, Registration Update processing is executed by setting the parameter to S=0. Incidentally, when no response is returned from the home agent server (20), an M-cast status is continued.

Next, processing executed by the seamless application processing unit (11) will be explained. When the processing unit (11) starts up, it executes connection of a basic access network (BAN). In the present invention, signaling communication in which communication is controlled so as to be continuously switched is executed in BAN. As shown in FIG. 2, the BAS client (12) and a BAS server (22) executes communication according to a BAS (Basic Access Signaling) protocol, and the embodiment employs SOAP (Simple Object Access Protocol). Further, after communication to a communication opponent starts, a wireless access network (RAN) is connected to execute other data communication in Mobile IP. Although connection to RAN and BAN is executed individually from wireless communication networks in the present invention as described above, whether any of wireless communication networks is used as BAN, RAN can be optionally switched.

Further, as one of the features of the present invention, it is possible to monitor the communication status of a communication device used as RAN and to switch the device automatically and continuously when abnormal communication is detected. Further, the device may be also manually switched when the user selects to do so. When communication is finished in RAN, RAN is automatically disconnected and a power supply of the device is also turned off.

The seamless application processing unit (11) includes a communication device scan function for determining whether it is possible or not to connect the network device (14) being connected, a communication device connection function for automatically connecting the device after the power supply of the device is turned on, a communication device monitor function for detecting link down of the device, and a communication device disconnection function for turning off the power supply after the device is automatically disconnected.

Further, as to RAN and BAN, the seamless application processing unit (11) also includes respective functions of a RAN connection function for setting RAN after start up, a RAN switch function for switching to next candidate RAN in response to detection of the link down and a switch instruction from the user or from the BAS client processing unit (12), and a BAN connection function for setting the network of a communication device used as BAN at present at start up.

The communication device scan function includes processing for obtaining electric wave intensity of a predetermined cycle from the network device (14) at the seamless application processing unit (11), and the cycle is selected from the seamless setting file (15). A method of obtaining the electric wave intensity depends on respective devices, and methods disclosed by manufacturers of hardware may be also used. When the electric wave intensity is obtained, it is determined by the seamless application processing unit (11) that when the electric wave density is equal to or larger than a threshold value, connection is possible and when it is less than the threshold value, connection is impossible.

The communication device connection function is a function for turning on power supplies when respective devices are used and dial-up connection is executed after the power supplies are turned on in a dial-up device such as a modem and the like of mobile phone and PHS. Further, in wireless LAN and the like, the communication device connection function sets the network of a device after the power supply is turned on. Incidentally, a dial-up setting file to respective providers is previously stored in the seamless setting file (15) and the like. Further, allocation of IP to respective networks (including DHCP) ESSID to wireless LAN access points, and passwords are previously set by the user and stored.

The communication device monitor function periodically monitors the link status of a device used for communication based on a value set in the seamless setting file (15). That is, the communication device monitor function obtains a communication status from a device driver of the network device (14), and when the communication status is abnormal, the function executes RAN switch processing. Further, in the wireless LAN, when signal intensity is equal to or less than a threshold value, link down is detected. Otherwise, the link down may be detected by a known method other than the above method.

The communication device disconnection function is a function for setting an unused device ineffective and turning off a power supply of the network device (14). In the dial-up connection, a dial is disconnected.

Next, RAN/BAN connection according to the present invention will be explained.

Figure 5:
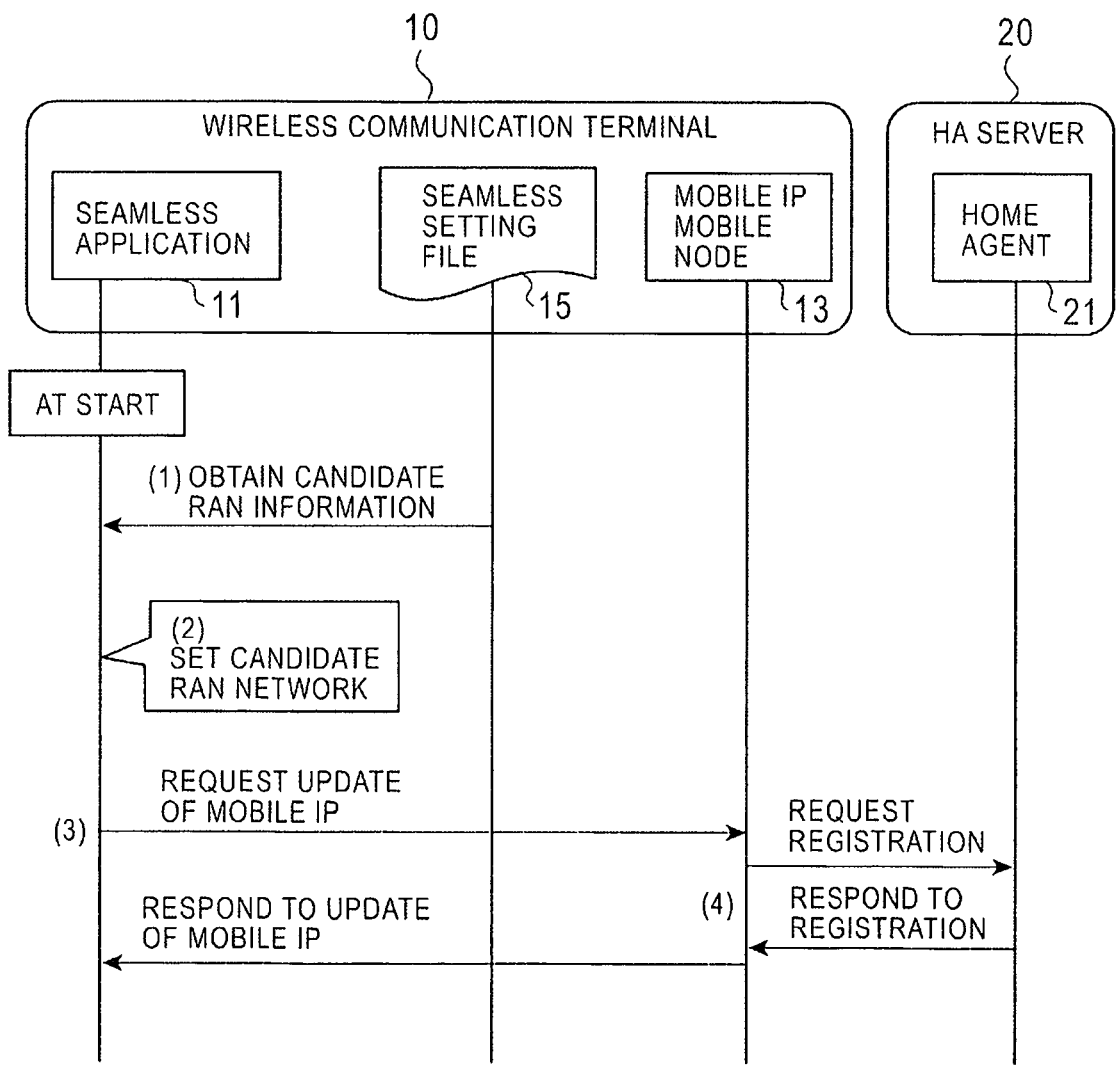
FIG. 5 shows a RAN connection sequence.

FIG. 5 shows a sequence of RAN connection. At start-up, a candidate RAN is obtained from the seamless setting file (15), and the wireless communication network thereof is connected as RAN. Until RAN is connected, connection to a next candidate RAN is tried.

That is, when a seamless application starts up, a list of RAN switch candidates is obtained, and a candidate RAN is connected and a network is set. Mobile IP update is requested to the Mobile IP mobile node (13) and registered. Then, information of connection as RAN is retained in the seamless application processing unit (11) as current RAN. The mobile node (11) requests Registration to the Mobile IP home agent processing unit (21) of the home agent server (20) by Dynamics function.

Note that when there is no RAN candidate in the seamless setting file (15), connection of RAN is executed again after a predetermined period of suspension.

Figure 6:
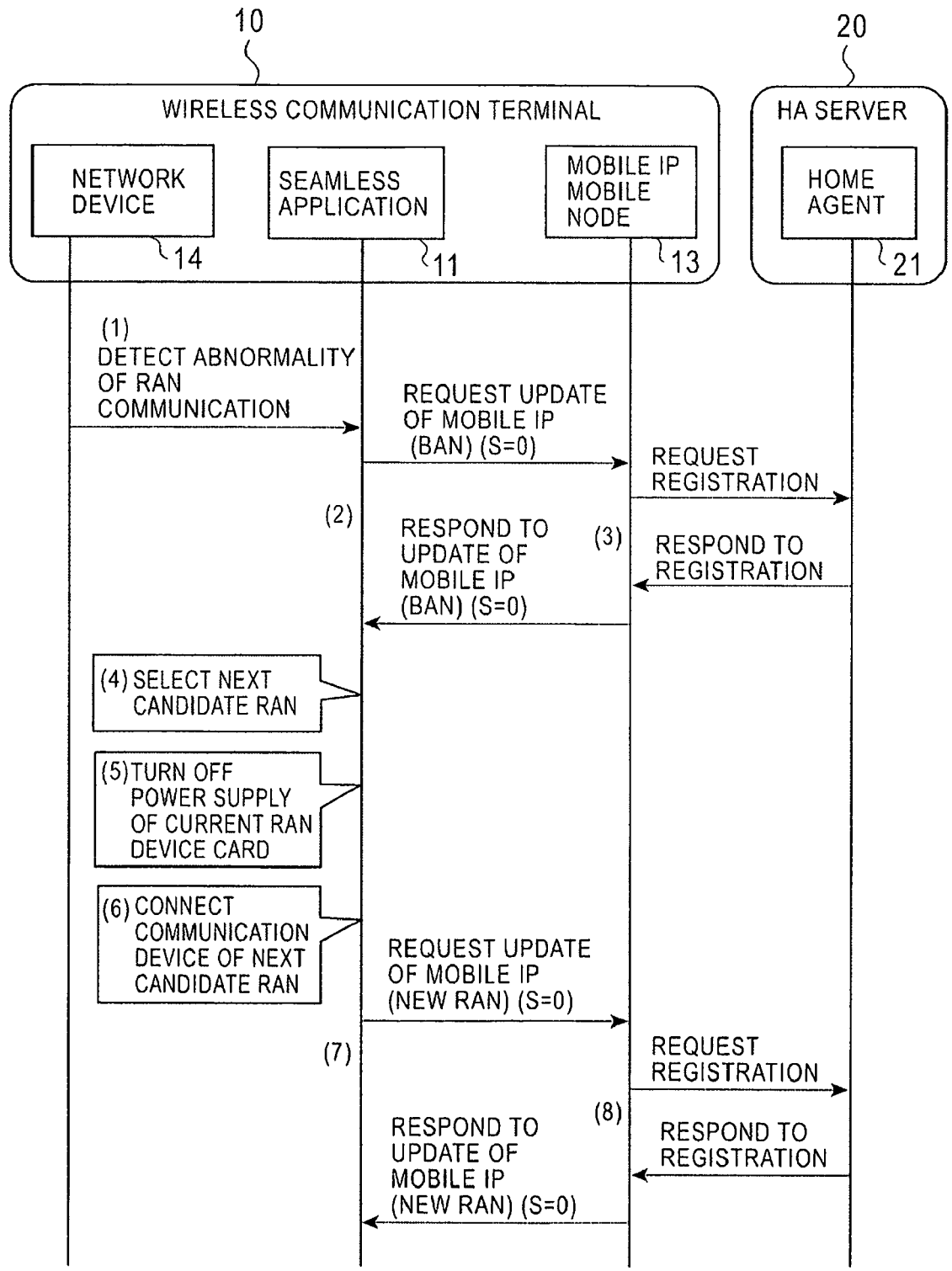
FIG. 6 shows a sequence for continuously switching RAN to next candidate RAN.

The present invention is characterized in that a plurality of access network RANs are switched as needed in response to an instruction from the user and according to the status of the network. FIG. 6 is shows a sequence for continuously switching RAN to a next candidate RAN when abnormal communication is detected in RAN.

That is, an abnormal communication of the network device (14) is detected by the seamless application processing unit (11), the wireless access network is switched to the basic access network by requesting Mobile IP update. That is, when connection of BAN is established and BAN is different from RAN, Mobile IP update is requested by setting the parameter to S=0 that means novel update, and connection is switched only to BAN. No update is executed in other cases.

When Mobile IP Update is requested, the Mobile IP mobile node (13) requests Registration to the Mobile IP home agent processing unit (21) by Dynamic function. With this request, connection is switched to BAN once.

Further, the seamless application processing unit (11) obtains the information of a next candidate RAN from the seamless setting file (15), and when the next candidate is different from BAN, the seamless application processing unit (11) makes the network of the current RAN whose abnormality is detected ineffective and turns off the power supply of a device as well as tries to connect to a next candidate RAN. Then, the seamless application processing unit (11) requests Mobile IP Update (S=0) to the new RAN to the mobile node (13), and the mobile node (13) requests Registration to the Mobile IP home agent processing unit (21) by Dynamic function.

When the next candidate is the same as BAN, since BAN can be used as it is, it is sufficient to execute only disconnection processing of the current RAN.

Figure 7:
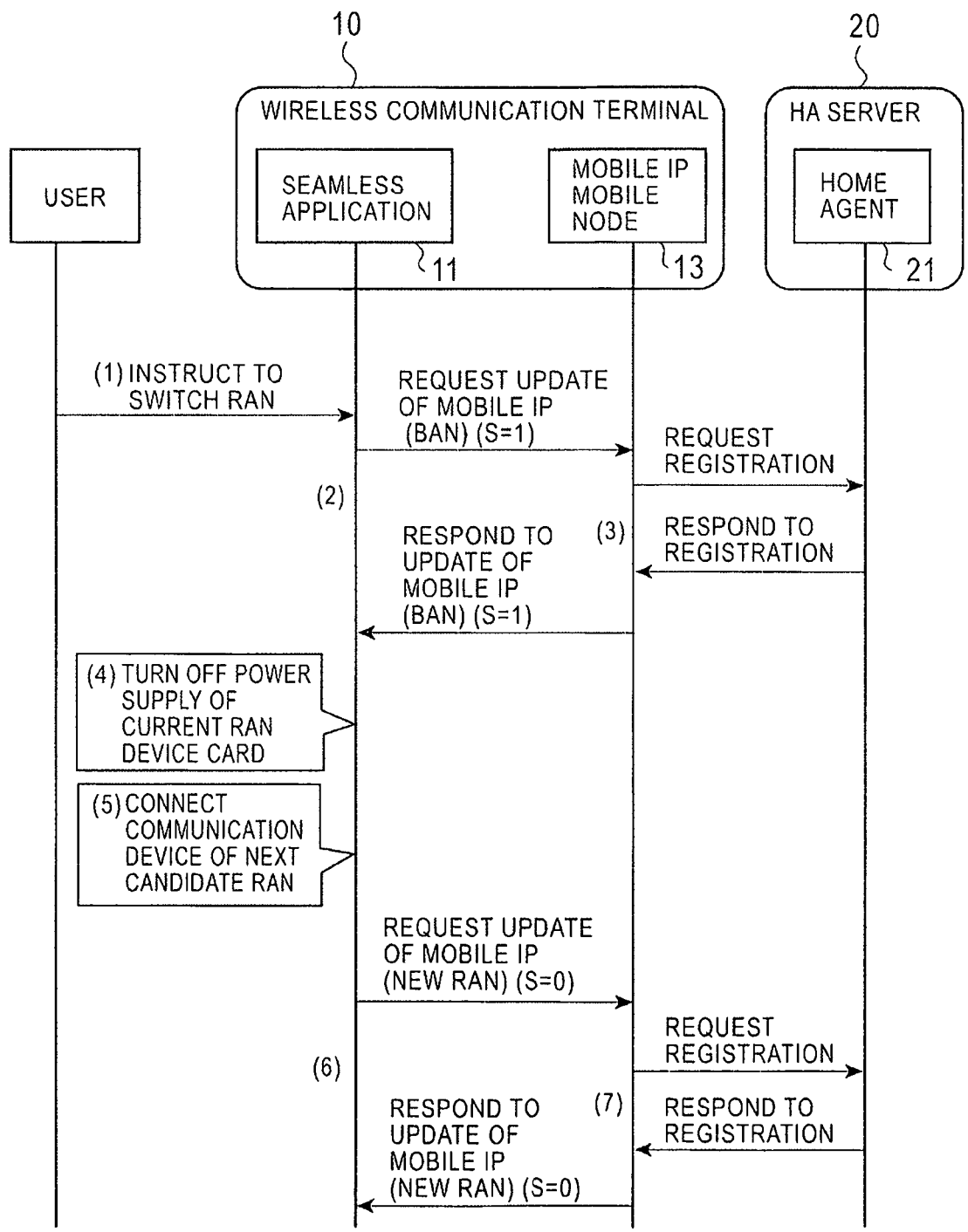
FIG. 7 shows a sequence when a user instructs to switch RAN.
Figure 8:
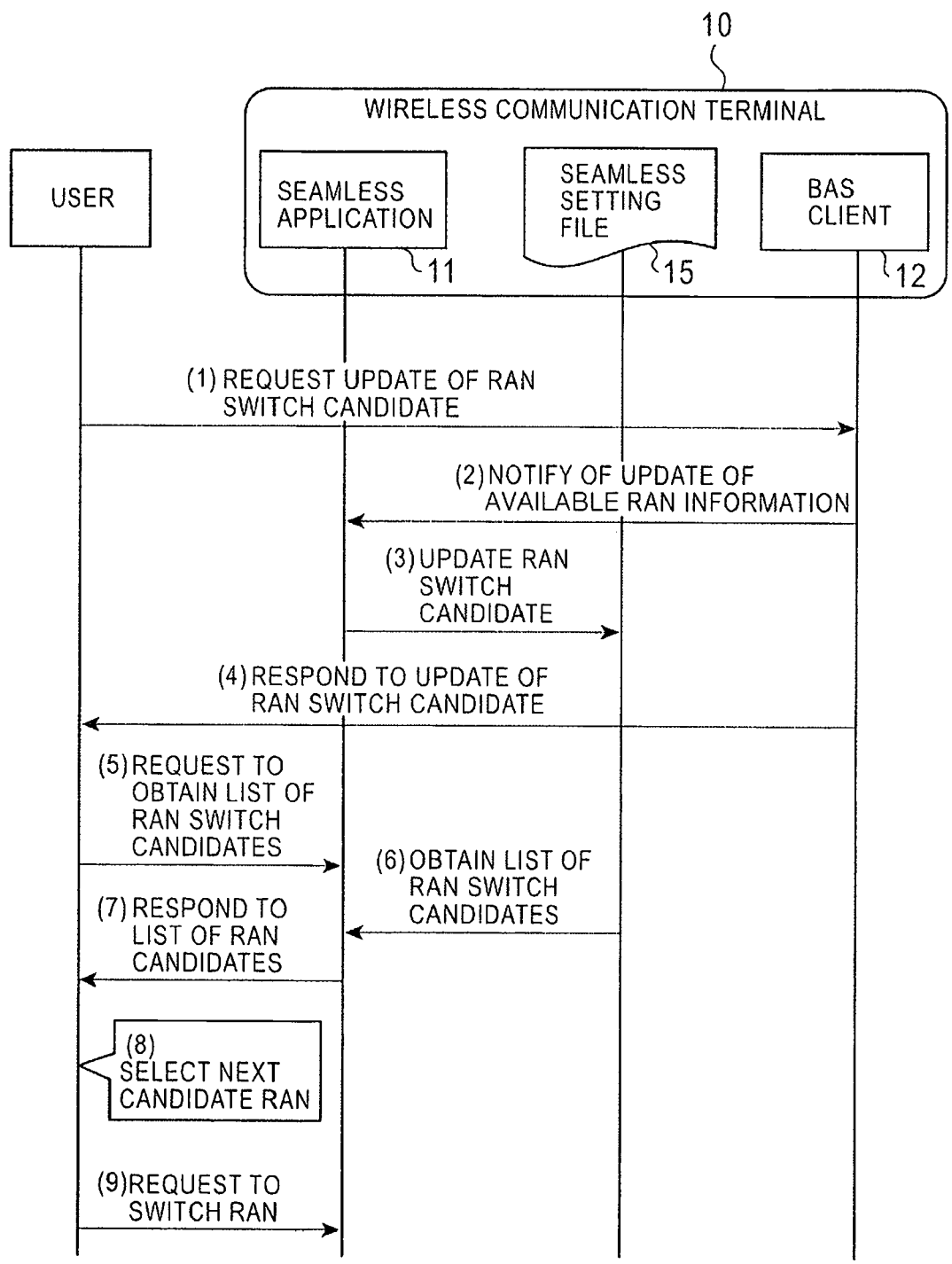
FIG. 8 shows a sequence for detecting an available RAN candidate by a BAS client processing unit.

FIG. 7 shows a sequence used when the user instructs to switch RAN. In this case, first, the user requests the seamless application processing unit (11) to obtain a list of selectable RAN candidates, and the seamless application processing unit (11) obtains the list of the RAN candidates from the seamless setting file (15). The seamless application processing unit (11) returns the list to the user who selects RAN and instructs switching.

When connection of BAN is established and BAN is different from RAN, the seamless application processing unit (11) requests Mobile IP update using the parameter set to S=1 that means additional update to execute connection of BAN in multicast in addition to a current RAN. No update is executed in other cases.

When Mobile IP update is requested, the Mobile IP mobile node (13) requests Registration to the Mobile IP home agent processing unit (21) by Dynamic function. With this request, even if link down of RAN occurs in midstream, connection by BAN is maintained.

Further, the seamless application processing unit (11) executes the following processing based on the relation among the current RAN and the RAN designated by the user BAN.

When BAN is the same as the current RAN, connection to the designated RAN and a request and registration of Mobile IP update (S=0) are executed while maintaining the network of the current RAN as it is.

When BAN is the same as the designated RAN, the current RAN is disconnected, and a request and registration of Mobile IP update (S=0) are executed.

When BAN is different from the current RAN and the designated RAN, the current RAN is disconnected, and a request and registration of Mobile IP update (S=0) of the designated RAN are executed.

When the user selects RAN, it is possible not only to detect it from all the devices but also to detect candidates by switching available RANs in the BAS client processing unit (12)

In this case, when the user sends a RAN switch candidate update request to the BAS client processing unit (12), the processing unit (12) searches available wireless communication networks and notifies the seamless application processing unit (11) of them.

As a result, the seamless application processing unit (11) updates the switch candidates of the seamless setting file (15) so that only available networks are made to candidates. The subsequent procedures are the same as the above procedures.

Figure 9:
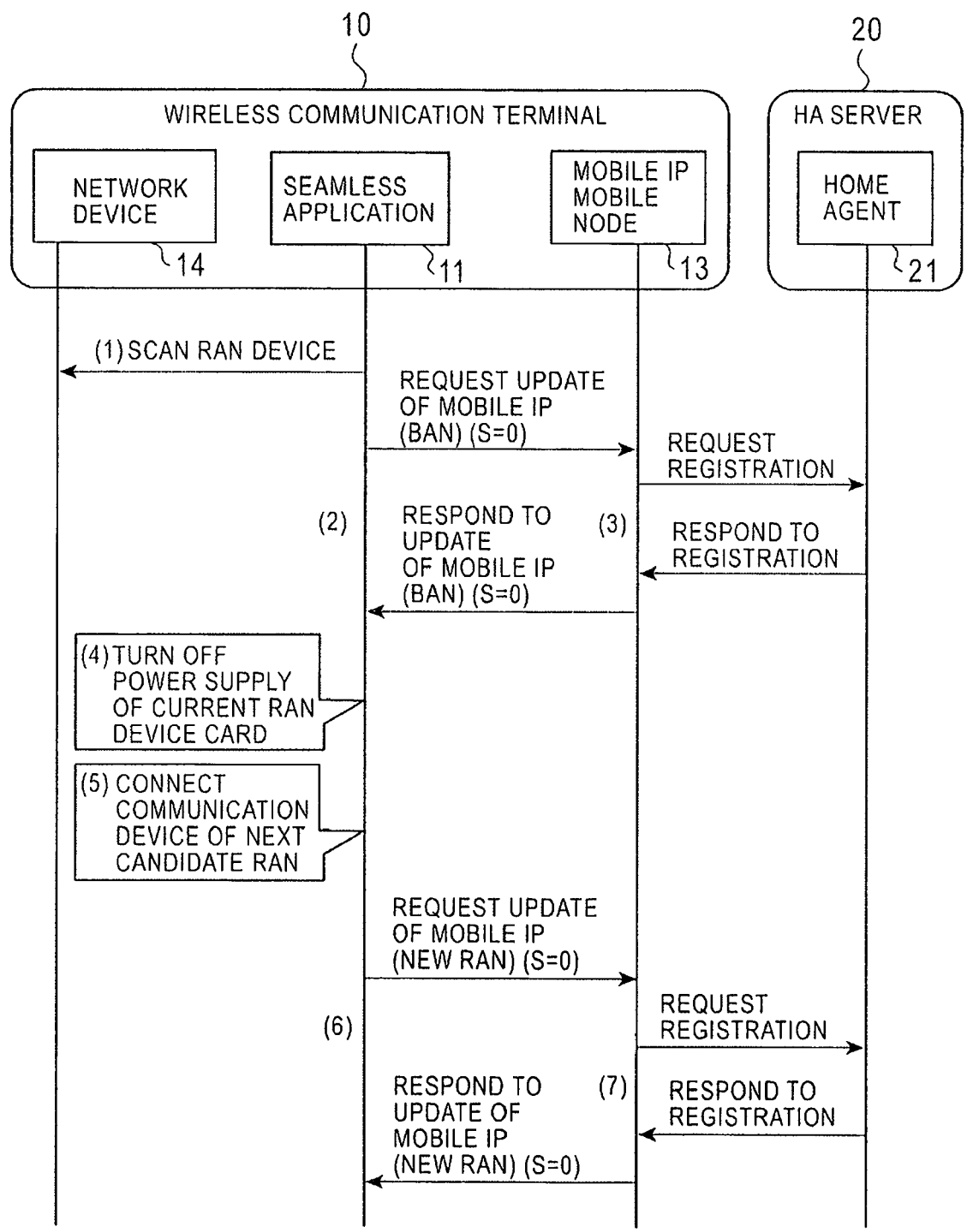
FIG. 9 shows a sequence of switching when it is possible to return to RAN having higher priority.

Further, the present invention is provided with a sequence for monitoring whether or not it is possible to switch to RAN having higher priority and for returning to the RAN when it is possible to switch to it. This is shown in FIG. 9.

The seamless application processing unit (11) scans communication devices by the above function, and, as a result of the scan, the seamless application processing unit (11) detects that it is possible to connect RAN that satisfies a band in use and has priority higher than that of the current RAN (RAN having higher ranking of candidate).

When BAN is different from the current RAN, the seamless application processing unit (11) requests Mobile IP update using the parameter S=0 that means novel update, and switches connection only to BAN. No update is executed in other cases.

When Mobile IP update is requested, the mobile node (13) requests Registration to the Mobile IP home agent processing unit (21) by Dynamic function. With this request, connection is switched to BAN once.

Further, the seamless application processing unit (11) executes processing for switching to RAN having high priority by the same processing as that of the case in which an instruction is made from the user.

Next, the present invention also provides an arrangement for switching RAN in response to an instruction from the BAS client processing unit (12) connected to the basic access network server processing unit (hereinafter, also called BAS server) (22) disposed to the HA server (20) through the basic access network.

Figure 10:
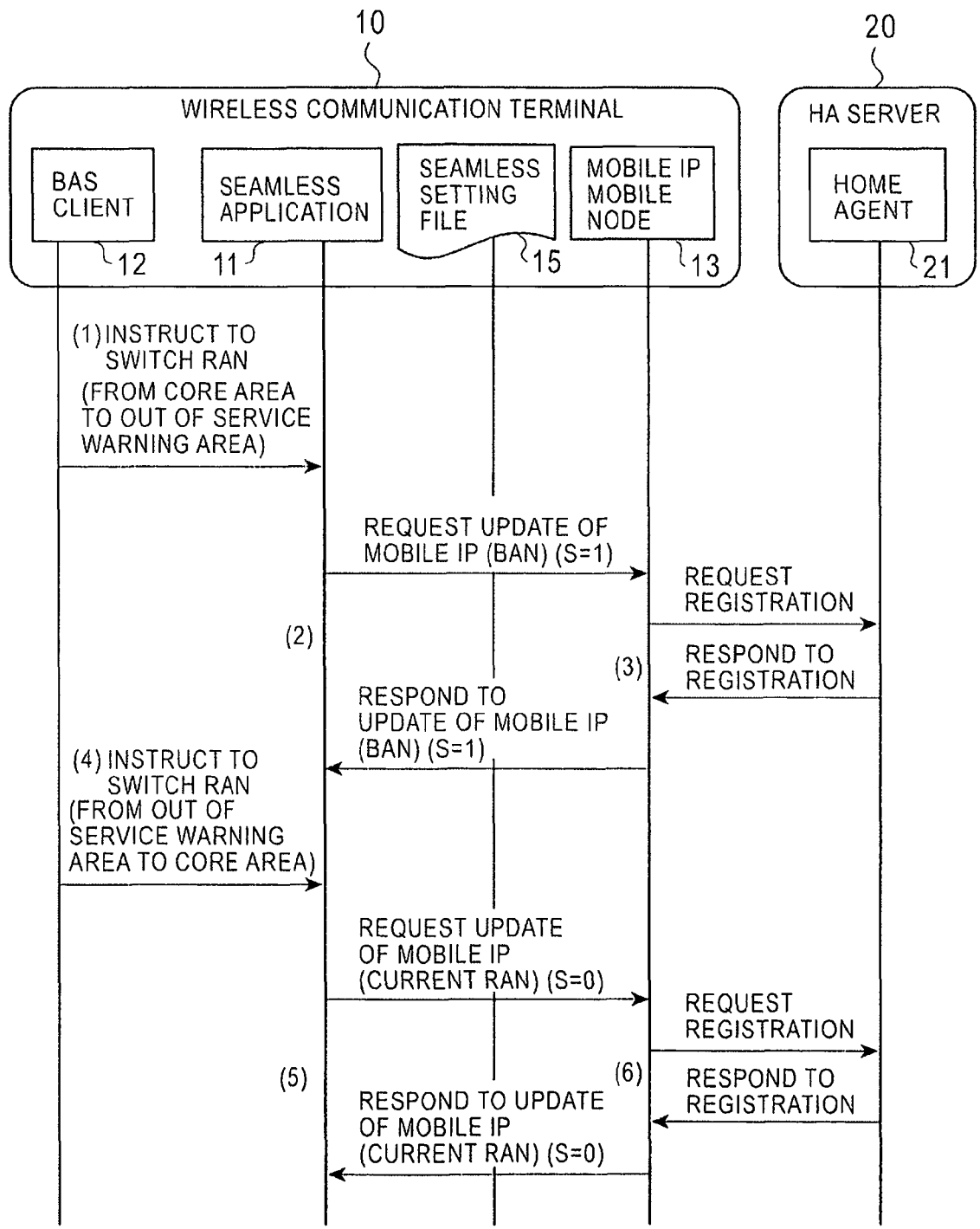
FIG. 10 shows a sequence for switching RAN in response to an instruction from the BAS client processing unit (from out of service warning to core area).

That is, as shown in FIG. 10, when the seamless application processing unit (11) receives a notification from the BAS client processing unit (12) that the wireless communication terminal (10) enters an out of service warning area from a core area, provided that the current RAN is different from BAN, the seamless application processing unit (11) requests Mobile IP update of S=1 to the network of BAN. The mobile node (13) requests Registration to the Mobile IP home agent processing unit (21) by Dynamics function. With this request, connection to BAN is added.

Then, when it is notified from the BAS client processing unit (12) that the wireless communication terminal (10) returns to the core area again, the seamless application processing unit (11) requests Mobile IP update of S=0 to the current RAN.

Figure 11:
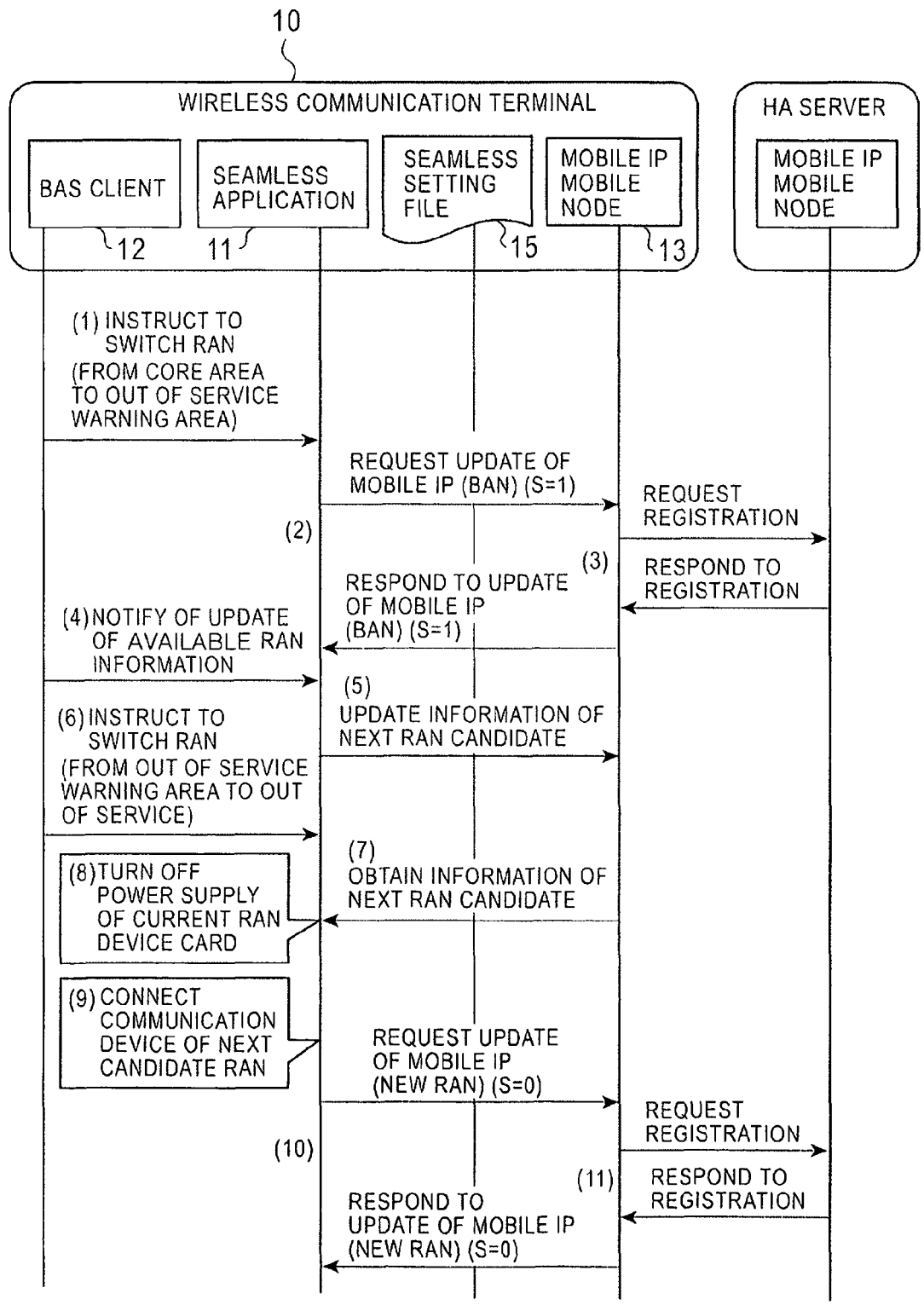
FIG. 11 shows a sequence for switching RAN in response to an instruction from the BAS client processing unit (from out of service warning to out of service).

In contrast, when the seamless application processing unit (11) obtains a notification from the BAS client processing unit (12) that the wireless communication terminal (10) goes to the out of service area without returning to the core area, the seamless application processing unit (11) obtains the RAN information of a next candidate from the seamless setting file (15) and executes disconnection processing of the current RAN as well as executes connection processing of the next candidate RAN as shown in the sequence of FIG. 11.

In the present invention, since RAN and BAN can be optionally switched, BAN can be switched likewise RAN described above. However, when the seamless application processing unit (11) starts up, first, the information of a BAN switch candidate is obtained from the seamless setting file (15), and the network is set such that the BAN switch candidate can be used as BAN. When the BAN candidate cannot be connected as BAN, a next BAN switch candidate is obtained again and the network is set.

Further, the BAS client processing unit (12) will be explained. The processing unit (12) includes respective functions of a service registration function for executing registration processing to the BAS server (22), a status notification function for notifying the BAS server (22) of a status at set intervals, a preference selection function as an interface for switching a preference currently selected to the user to other preference, a RAN candidate acquisition function for acquiring RAN candidates by sending a terminal discovery request to the BAS server (22), and a switch instruction receiving function for receiving a terminal shift notification from the BAS server (22) and instructing the seamless application processing unit (11) to switch RAN after a RAN candidate is updated.

Figure 12:
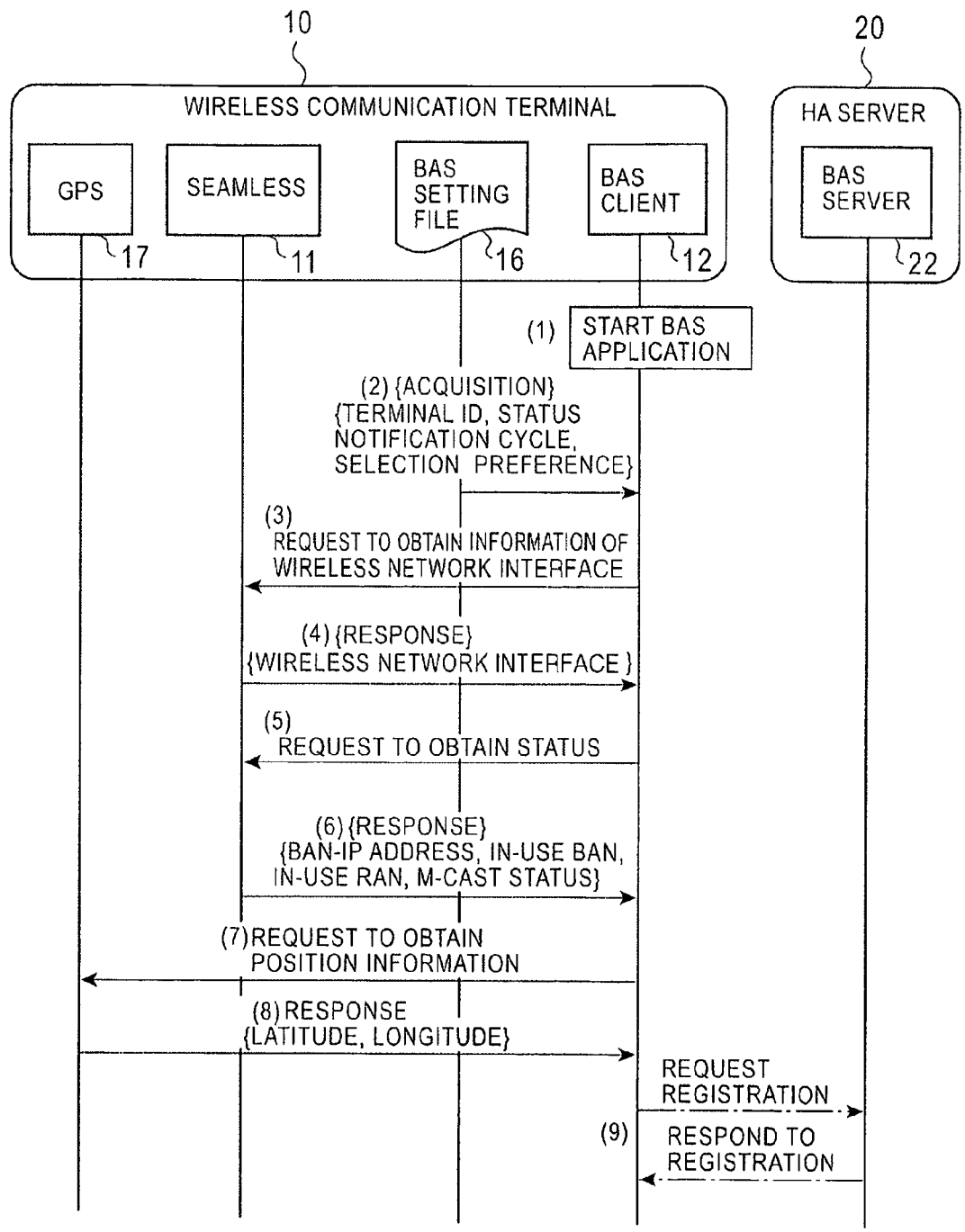
FIG. 12 shows a sequence of a service registration function.

FIG. 12 shows a sequence of the service registration function. First, BAS client processing unit (12) obtains a terminal ID, a cycle for notifying a set status, and a set preference from the BAS setting file (16) of a terminal (refer to FIG. 2) in response to the start-up of a BAS application of the terminal. Then, the BAS client processing unit (12) requests the seamless application processing unit (11) to obtain information of which wireless network interfaces implemented and obtains it. Further, the BAS client processing unit (12) requests the seamless application processing unit (11) to obtain a current network status and obtains an in-use BAN, its IP address, an in-use RAN, and the status of M-cast.

Further, the BAS client processing unit (12) requests a GPS receiver (17) to obtain position information and obtains the position information of latitude and longitude.

Thereafter, the BAS client processing unit (12) registers these information to the BAS server (22) as initial information through the basic access network.

These informations are periodically obtained in such a manner that the BAS client processing unit (12) requests the seamless application processing unit (11) and the GPS receiver (17) to obtain status information and position information at the status notification cycle, and the information on the BAS server (22) is updated thereby. This is the status notification function.

Which communication network is to be preferentially switched when a wireless communication terminal shifts and RAN is automatically switched is stored in the BAS setting file (16) as a preference. As a selectable preference, there are available a fee preference that gives priority to a wireless communication network having a lowest cost, a band preference that gives priority to a wireless communication network having a large band, a range preference that gives priority to a wireless communication having a large range of area, a communication stability preference that gives priority to a wireless communication network having a good connection property, a power saving preference that gives priority to a wireless communication network having small power consumption. Numerical values are set to each of the preferences, and, for example, 3, 4, 3, 5, 2, are sequentially defined in PHS, and 4, 5, 1, 3, 4 are sequentially defined in 2G.

With this arrangement, when the user selects only the fee preference, priority of selection is set in the order of, for example, wireless LAN, PHS, 2G, 3G, and the like.

To set a RAN switch candidate based on a set preference, WRD (Wireless Resource Discovery) is sent to the BAS server (22). It is sent when the user changes a preference and when the user requests to obtain available RAN information.

The BAS client processing unit (12) obtains a selection preference from the BAS setting file (16) and notifies the BAS server (22) of it through the basic access network.

The BAS server (22) returns the available RAN switch candidates, to which priority is given, to the terminal based on the notified preference. The BAS client processing unit (12) notifies the seamless application processing unit (11) of the switch candidates obtained thereby. The seamless application processing unit (11) stores the switch candidates in the seamless setting file (15) together with the ordering thereof. The information is used to switch the network described above.

Further, when the BAS server (22) determines that the wireless communication network that is currently used as RAN enters the out of service warning area, it instructs the terminal to switch the wireless network. That is, when a RAN switch request occurs in the server, an available network is notified from the BAS client processing unit (12) to the seamless application processing unit (11) through a terminal shift notification. The seamless application processing unit (11) updates the RAN candidate information of the seamless setting file (15) according to the notification. Further, the BAS client processing unit (12) instructs the seamless application processing unit (11) to switch RAN. Subsequent processings are the same as those described above.

The wireless communication terminal according to the present invention is arranged as described above. Next, the arrangement of a wireless communication server will be explained.

The wireless communication server is composed of the home agent server (20) and the resource server (30). The home agent server (20) is composed of the Mobile IP home agent processing unit (21) and the BAS server (22), and the resource server (30) stores various information such as a terminal status table and the like.

The home agent processing unit (21) sets M-cast transmission in response to Registration Update (S=1) from the Mobile IP mobile node processing unit (13) and cancels it in response to Registration Update (S=0). Further, the home agent processing unit (21) notifies of a status of M-cast in response to an enquiry from the BAS server (22).

When an M-cast transmission function starts up, an IP address of a transmission object and an IP address of a transmission source are used as parameters. Thereafter, the same packet is transmitted to a different opponent address.

Figure 13:
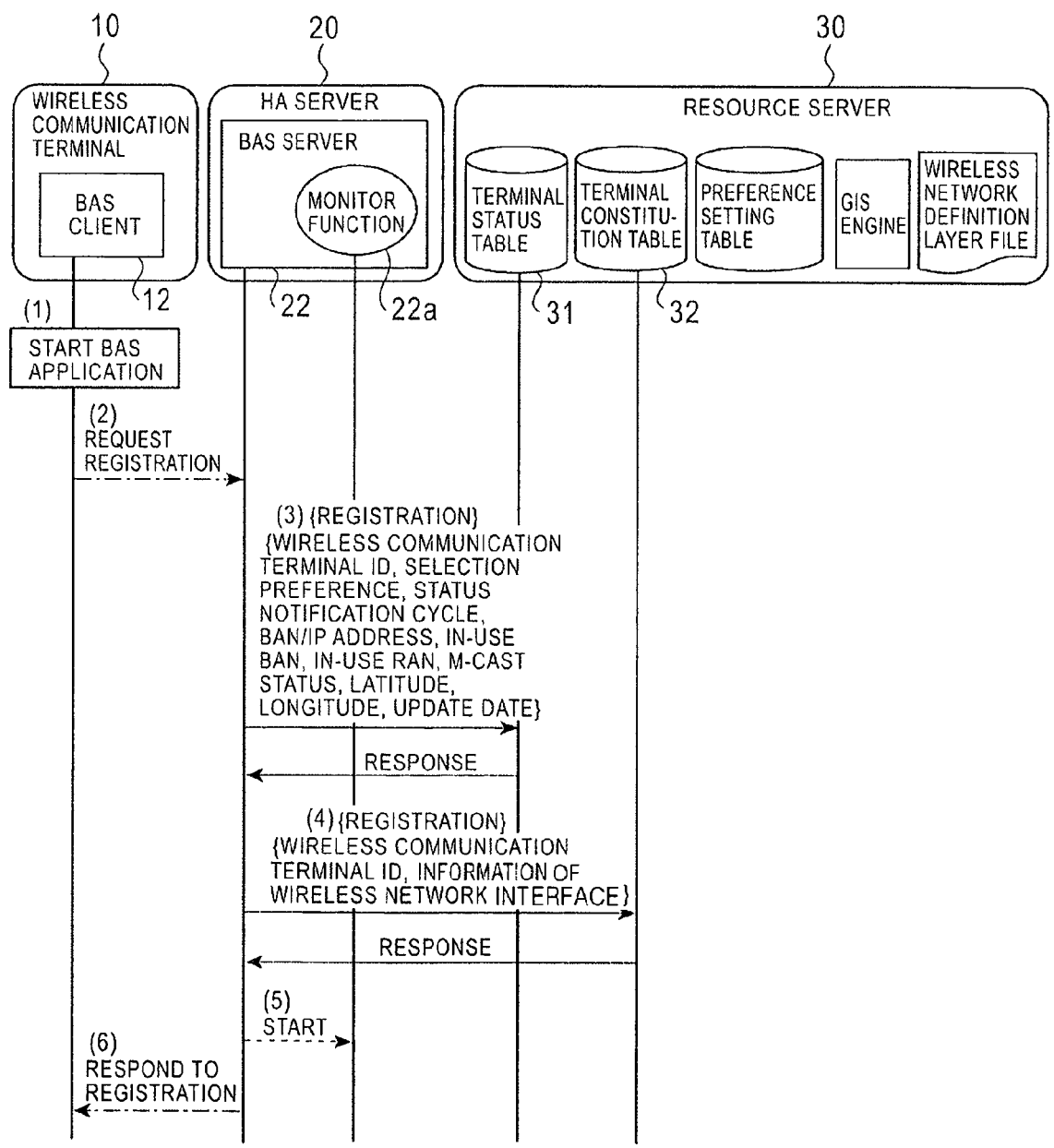
FIG. 13 shows a sequence of a terminal registration function.

Further, as shown in FIG. 13, a wireless communication terminal ID, a selection preference, a status notification cycle, an IP address of BAN, an in-use BAN, an in-use RAN, a status of M-cast, a latitude, a longitude, an update date, and the like are registered from the BAS server (22) to a terminal status table (31) of the resource server (30) in response to a request for registration from the BAS client processing unit (12).

Further, the ID of a notified wireless communication terminal and the information of wireless network interface implemented in the wireless communication terminal is registered to a terminal configuration table (32) of the resource server (30).

Then, after a monitor function (22a) that will be described below is started, the terminal configuration table (32) returns a response of registration to the BAS client processing unit (12).

Thereafter, to notify that the wireless communication terminal is updated by the terminal status update function, an update request is periodically issued from the BAS client processing unit (12), and the update information is added to the terminal status table as necessary.

Figure 14:
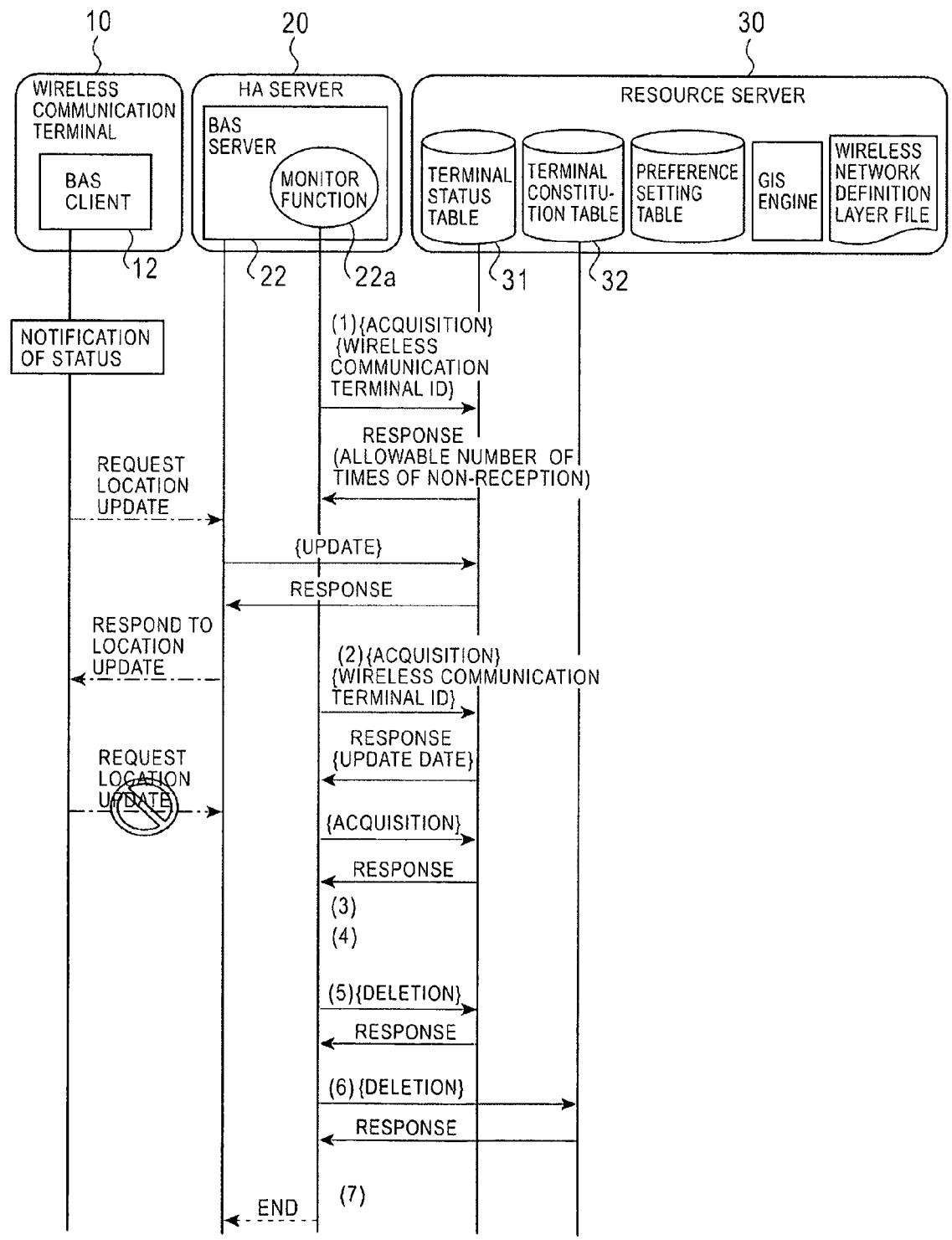
FIG. 14 shows a sequence of a registered status monitor function.

The BAS server (22) includes a registration status monitor function which further monitors the update request by the monitor function (22a) and cancels registration of service when a request is not received at synchronized intervals judging that it is impossible to provide service in the terminal. FIG. 14 shows a sequence of the function. After a processing unit of the function obtains the allowable number of times of non-reception of the update request from the terminal status table (31), the processing unit periodically obtains an update date, and if the request is not received at a set cycle from the update date, the processing unit counts it as the number of times of non-reception.

When the count value exceeds the allowable number of times of non-reception, it is determined that the service of the wireless communication terminal cannot be used, and the information of the terminal is deleted from the terminal status table (31) and the terminal configuration table (32). According to the arrangement of the present invention, when the information of the terminal is deleted, the terminal is deleted from the switch candidates in the seamless application processing unit (11).

The BAS server (22) also includes a terminal position status monitor function. The function monitors the position of a wireless communication terminal whose service is registered at registered intervals, and when the wireless communication terminal is located in a warning area out of a RAN area used currently, the function sends a switch instruction to the terminal.

Figure 15:
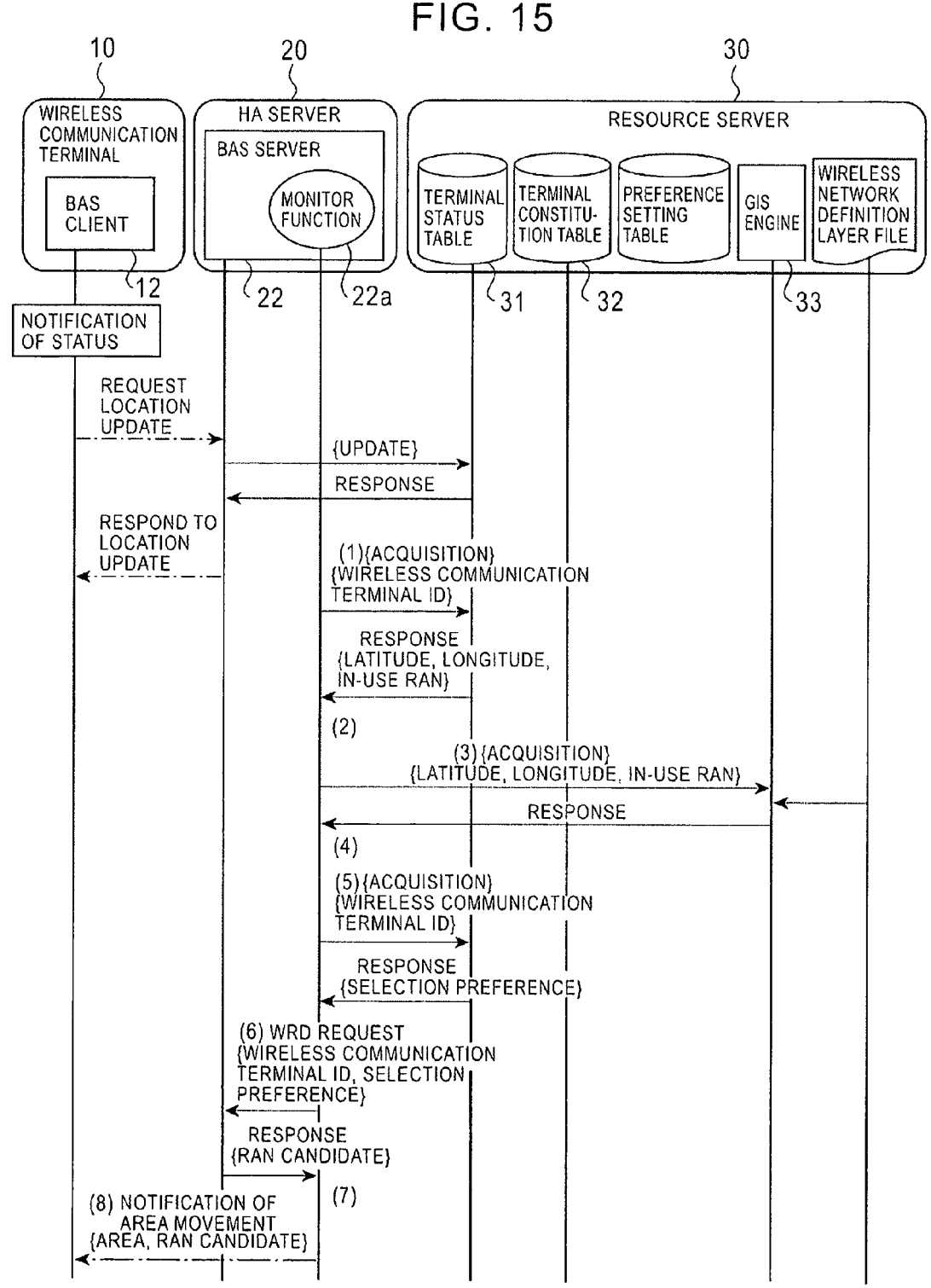
FIG. 15 shows a sequence of a terminal position status monitor function.

FIG. 15 shows a sequence of the function.

The BAS server (22) obtains the position information of the wireless communication terminal and an in-use RAN from the terminal status table (31), and when the position information previously monitored by the processing unit of the monitor function (22a) is different from the current position information, the BAS server (22) issues an enquiry to a GIS engine unit (33) that contrasts respective core areas without of service warning areas.

When the wireless communication terminal is located in a core area as a result of the enquiry, the processing unit goes to a next monitoring. However, when the wireless communication terminal is located in an out of service warning area, the processing unit obtains the selection preference from the terminal status table (31), obtains a RAN candidate by internally issuing a terminal discovery request, and sends a terminal shift notification to the BAS client processing unit (12).

In addition to the above mentioned, when the wireless communication terminal returns to the core area from the out of service warning area or shifts to the outside of the core area, the processing explained in the seamless application processing unit (11) is executed.

Figure 16:
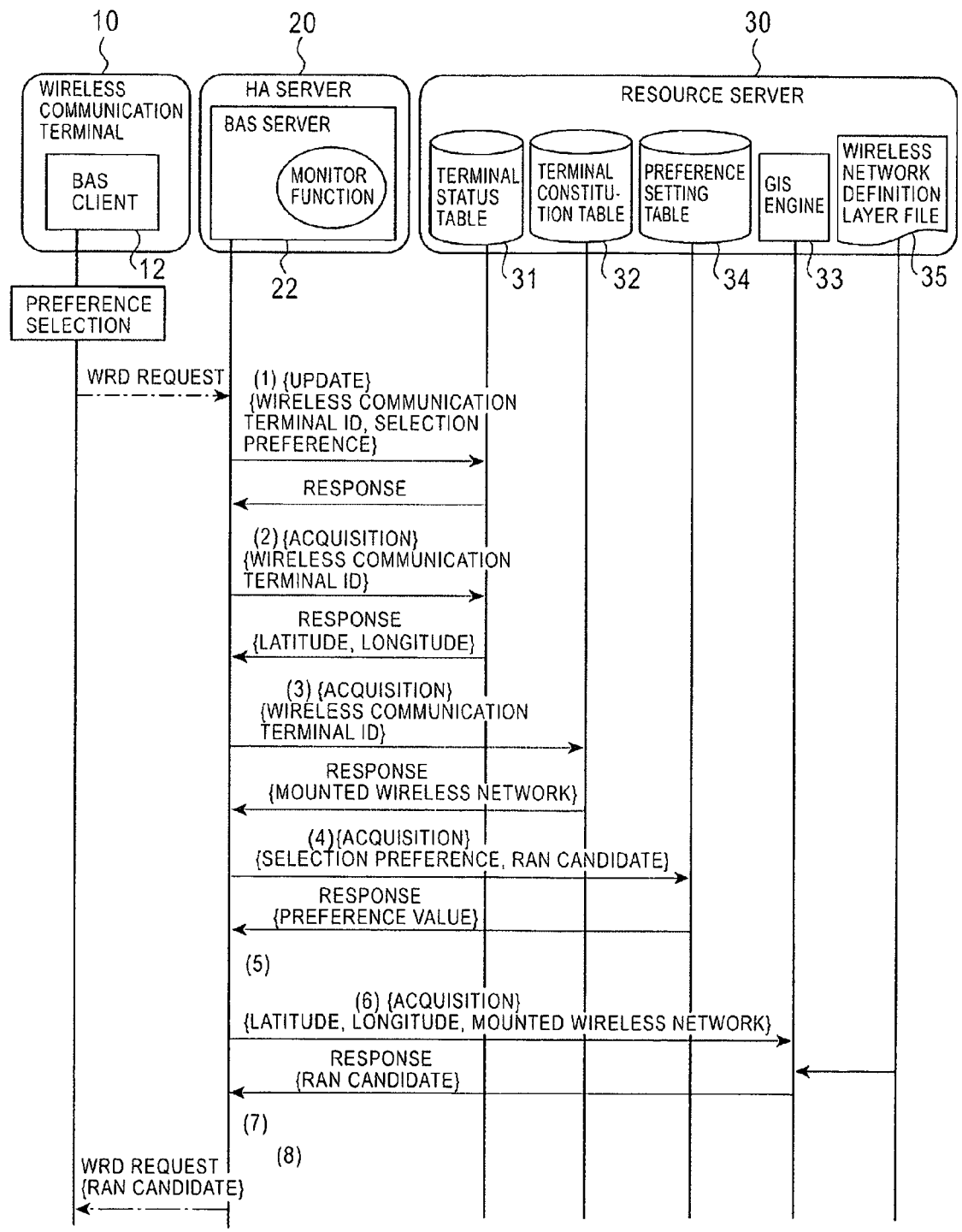
FIG. 16 shows a sequence of a terminal RAN candidate creation function.

A method of obtaining the RAN candidate will be explained. FIG. 16 shows a sequence for setting a wireless communication network that can be used at a current position as a switching candidate when an in-use RAN is disconnected. First, when the BAS server (22) receives a terminal discovery request, it reflects a selection preference to the terminal status table (31), respectively. At the same time, the BAS server (22) obtains the position information of the terminal from the terminal status table (31) and the information of wireless network interfaces from the terminal configuration table (32). Further, the BAS server (22) obtains all the wireless communication networks that are ordered by the selection preference from a preference setting table (34). The BAS server (22) orders the wireless communication network interfaces from the combination of them and issues an enquiry to the GIS engine unit (33) as to whether or not the networks can be used at a current position in the order of higher priority.

The BAS server (22) sequentially creates available RAN candidates and returns them to the BAS client processing unit (12) as a response.

Although the wireless communications system according to the present invention is arranged as described above, the present invention can be optionally arranged within the scope disclosed in the appended claims.

The invention claimed is:

1. A wireless communications system comprising at least one wireless communication terminal and a wireless communication server, wherein
the wireless communications system is able to be connected to at least two kinds of wireless communication networks simultaneously, two of the wireless communication networks are to work as a basic access network and a wireless access network, respectively;
the basic access network is able to deal with data communications in addition to signaling communication, and the wireless access network deals with only data communications; and
when the wireless communication terminal detects communication trouble in the wireless access network, to which the wireless communication terminal is currently connecting, the wireless communication terminal searches a new wireless communication network available, and the wireless communication terminal temporary uses the currently-connecting basic access network for data communications in addition to signaling communication until the new wireless communication network is designated as a new wireless access network.

2. The wireless communications system according to claim 1, wherein when the wireless communications system are simultaneously connected to the basic access network and the wireless access network and the wireless communication terminal detects no communication trouble in the wireless access network, the wireless communication terminal uses the wireless access network for data communications only and continues using the basic access network for signaling communications without using the basic access network for data communications.

3. The wireless communications system according to claim 1, wherein:
the wireless communication terminal comprises a seamless application processing unit for executing connection processing to the basic access network and connection/disconnection processing to and from the wireless access network, a basic access network client processing unit having a client function in the signaling communication, a multicast communication node application processing unit for setting multicast reception using at least the two kinds of the wireless communication networks, and respective network devices corresponding to the respective wireless communication networks, and the respective wireless communication terminal identifies the geographical position of the respective wireless communication terminal and informs the wireless communication server of the geographical position of the respective wireless communication terminal.

4. The wireless communications system according to claim 3, wherein:
when the seamless application processing unit of the wireless communication terminal executes connection processing to the basic access network, the seamless application processing unit tries to connect to the network with reference to basic access network candidate information that in advance records the wireless communication networks used as a candidate for the basic access network as well as when the network cannot be connected, the seamless application processing unit executes processing for sequentially trying to connect to a next candidate network.

5. The wireless communications system according to claim 3, wherein when the network device of a wireless communication terminal detects abnormal communication of the wireless access network, after the seamless application processing unit notifies the multicast communication node processing application unit of switching of communication to the basic access network and then switches the communication, the seamless application processing unit tries to connect to a wireless access network acting as a next candidate with reference to wireless access network candidate information that in advance records the candidates of wireless communication networks used as the wireless access network as well as when the network cannot be connected, the seamless application processing unit executes processing for sequentially trying to do network connection to a next candidate in the condition that the wireless access network is not the same as the basic access network and the basic access network is connected.

6. The wireless communications system according to claim 3, wherein when a user instructs to switch the wireless access network or the basic access network in the wireless communication terminal, after the seamless application processing unit notifies the multicast communication node application processing unit of switching of communication to the basic access network, the seamless application processing unit executes processing for changing network connection from the current wireless access network or basic access network to a specified wireless access network or basic access network.

7. The wireless communications system according to claim 1, wherein:
the wireless communication server comprises a home agent application processing unit for setting a multicast transmission using at least the two kinds of the wireless communication networks, a basic access network server processing unit for notifying, when the wireless communication networks are continuously switched, the wireless communication terminals of a wireless communication network acting as a switching candidate, for managing the signaling communication for communicating the status of the respective wireless communication terminals therebetween, and for managing the registration/update processing of the respective wireless communication terminals, a terminal status table for managing the status of the respective wireless communication terminals, a terminal configuration table for managing wireless communication network interfaces implemented in the respective wireless communication terminals, and a preference setting table for managing the order of the wireless communication networks acting as switching candidates when the wireless communication networks are continuously switched, and the wireless communication server updates the geographical position of the wireless communication terminal, which is obtained from the respective wireless communication terminal, and informs the wireless communication terminal of available wireless networks when the respective wireless communication terminal enters an out-of-service area.

8. The wireless communications system according to claim 7, wherein
the wireless communication server comprises two servers of,
a home agent server comprising the home agent application processing unit and the basic access network server processing unit, and
a resource server comprising the terminal status table, the terminal configuration table, and the preference setting table; and
the basic access network server processing unit obtains or registers the information in the respective tables of the resource server through a wired or wireless communication network.

9. The wireless communications system according to claim 7, wherein the terminal status table provides information relating to at least the identification symbols of the wireless communication terminals, the basic access network in use, the wireless access network in use, and a multicast communication status.

* * * * *

UNITED STATES PATENT AND TRADEMARK OFFICE
CERTIFICATE OF CORRECTION

| | | |
|---|---|---|
| PATENT NO. | : 8,055,255 B2 | |
| APPLICATION NO. | : 10/579732 | |
| DATED | : November 8, 2011 | |
| INVENTOR(S) | : Masugi Inoue et al. | |

It is certified that error appears in the above-identified patent and that said Letters Patent is hereby corrected as shown below:

ON THE TITLE PAGE:

At item (73), Assignee, change:

"(73) Assignee: National Institute of Information and Communications Technology, Incorporated Admistrative Agency, Tokyo (JP)"

to

--(73) Assignee: National Institute of Information and Communications Technology, Incorporated Administrative Agency, Tokyo (JP)--.

Signed and Sealed this
Twenty-sixth Day of June, 2012

David J. Kappos
*Director of the United States Patent and Trademark Office*